(12) United States Patent
Kiryu (10) Patent No.: US 11,874,892 B2
(45) Date of Patent: Jan. 16, 2024

(54) INFORMATION PROCESSING APPARATUS AND NON-TRANSITORY COMPUTER READABLE MEDIUM STORING PROGRAM FOR BROWSING CONFIDENTIAL INFORMATION

(71) Applicant: FUJIFILM Business Innovation Corp., Tokyo (JP)

(72) Inventor: Shunsuke Kiryu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 711 days.

(21) Appl. No.: 16/856,042

(22) Filed: Apr. 23, 2020

(65) Prior Publication Data

US 2021/0103629 A1    Apr. 8, 2021

(30) Foreign Application Priority Data

Oct. 7, 2019 (JP) .................................. 2019-184467

(51) Int. Cl.
*G06F 16/957* (2019.01)
*G06F 21/62* (2013.01)

(52) U.S. Cl.
CPC ...... *G06F 16/9577* (2019.01); *G06F 21/6218* (2013.01)

(58) Field of Classification Search
CPC .. G06F 16/9577; G06F 16/93; G06F 21/6218; G06F 21/6245
See application file for complete search history.

(56) References Cited

U.S. PATENT DOCUMENTS

| | | | |
|---|---|---|---|
| 7,013,325 B1* | 3/2006 | Vivian | G09B 5/00 434/323 |
| 9,262,104 B2* | 2/2016 | Amano | G06F 3/1238 |
| 11,178,231 B2* | 11/2021 | Yokoyama | H04L 51/18 |
| 2011/0131175 A1* | 6/2011 | Kawai | G06F 40/103 707/E17.008 |
| 2016/0283698 A1* | 9/2016 | Huang | G06F 21/32 |
| 2017/0206366 A1* | 7/2017 | Fay | G06F 40/106 |
| 2019/0132481 A1* | 5/2019 | Yasui | H04N 1/444 |

FOREIGN PATENT DOCUMENTS

| | | |
|---|---|---|
| JP | 2011118569 | 6/2011 |
| JP | 2018022468 | 2/2018 |

OTHER PUBLICATIONS

"Notice of Reasons for Refusal of Japan Counterpart Application", dated Jun. 20, 2023, with English translation thereof, p. 1-p. 5.
"Notice of Reasons for Refusal of Japan Counterpart Application", dated Sep. 5, 2023, with English translation thereof, p. 1-p. 3.

* cited by examiner

*Primary Examiner* — Han Yang
(74) *Attorney, Agent, or Firm* — JCIPRNET (57) ABSTRACT

An information processing apparatus includes a processor configured to, for each confidential information which is information included in a document and having confidentiality, set a user to which a browsing permission is not granted for the confidential information, and in a case where the document for which an output request is made from the user includes the confidential information for which the browsing permission is granted to the user and the browsing permission is not granted to another user, notify the user that the browsing permission is not granted to the other user for the confidential information.

13 Claims, 7 Drawing Sheets

BROWSING RESTRICTION INFORMATION

| DOCUMENT ID | CONFIDENTIAL INFORMATION | USER |
|---|---|---|
| doc1 | S1 | USER A |
| doc1 | S2 | USER B |
| doc1 | S3 | USER A AND USER B |

ORIGINAL DOCUMENT

FIG. 5B

DOCUMENT FOR USER A

FIG. 5C

DOCUMENT FOR USER B

FIG. 5D

DOCUMENT FOR USER C

FIG. 6A

ORIGINAL DOCUMENT

FIG. 6B

DOCUMENT FOR USER C

FIG. 7A

ORIGINAL DOCUMENT

FIG. 7B

DOCUMENT FOR USER A

FIG. 7C

DOCUMENT FOR USER B

FIG. 7D

DOCUMENT FOR USER C

FIG. 8

BROWSING RESTRICTION INFORMATION

| DOCUMENT ID | CONFIDENTIAL INFORMATION | USER |
|---|---|---|
| doc2 | S4 | USER A |
| doc2 | S5 | USER B |
| doc2 | S6 | USER A AND USER B |

INFORMATION PROCESSING APPARATUS AND NON-TRANSITORY COMPUTER READABLE MEDIUM STORING PROGRAM FOR BROWSING CONFIDENTIAL INFORMATION

CROSS-REFERENCE TO RELATED APPLICATIONS

This application is based on and claims priority under 35 USC 119 from Japanese Patent Application No. 2019-184467 filed Oct. 7, 2019.

BACKGROUND

(i) Technical Field

The present invention relates to an information processing apparatus and a non-transitory computer readable medium storing a program.

(ii) Related Art

In recent years, the number of offices in the form of a shared office in which a plurality of companies and individual proprietors work on the same floor of a building tends to be increased. The shared office is a case where companies and the like of different industries cooperate for the purpose of creating ideas breaking existing concepts. In this case, documents such as materials may be shared, and the creator of a document may distribute the document after concealing a part in which confidential information is disclosed from the viewpoint of security. In addition, the part to be concealed may vary depending on a distribution destination of the document.

JP2018-022468A is an example of the related art.

SUMMARY

Among users who share the document, a user to which a browsing permission for the confidential information in the document is not granted due to concealing of the confidential information by blacking out, deletion, and the like may check the concealed part by referring to the document. The concealed confidential information may not be obtained from the document. Meanwhile, a user to which the browsing permission for the confidential information in the document is granted may obtain the confidential information from the document but may not know the information for which the browsing permission is not granted to the other user in the document.

Thus, there is a possibility that the user to which the browsing permission for the confidential information is granted delivers the confidential information to the other user to which the browsing permission is not granted by verbal description and the like. Conversely, even in a case where the browsing permission for the confidential information is granted to the other user, a problem may arise in that discussion and the like with the other user may not be efficiently performed due to a concern that the browsing permission is not granted.

Aspects of non-limiting embodiments of the present disclosure relate to an information processing apparatus and a non-transitory computer readable medium storing a program that inform a user not restricted from browsing confidential information which is information included in a document and having confidentiality that another user is restricted from browsing the confidential information.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to, for each confidential information which is information included in a document and having confidentiality, set a user to which a browsing permission is not granted for the confidential information, and in a case where the document for which an output request is made from the user includes the confidential information for which the browsing permission is granted to the user and the browsing permission is not granted to another user, notify the user that the browsing permission is not granted to the other user for the confidential information.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described based on the drawings.

An information processing apparatus in this exemplary embodiment may be implemented by a general-purpose hardware configuration such as a personal computer (PC) that already exists. That is, the information processing apparatus in this exemplary embodiment includes a CPU and a storage section such as a ROM, a RAM, and a hard disk drive (HDD), a user interface, and also a communication section such as a network interface as necessary. The user interface may be configured by disposing a mouse and a keyboard as an input section and disposing a display as a display section. Alternatively, the user interface may be configured with a touch panel liquid crystal panel or the like that doubles as the input section and the display section.

Figure 1:
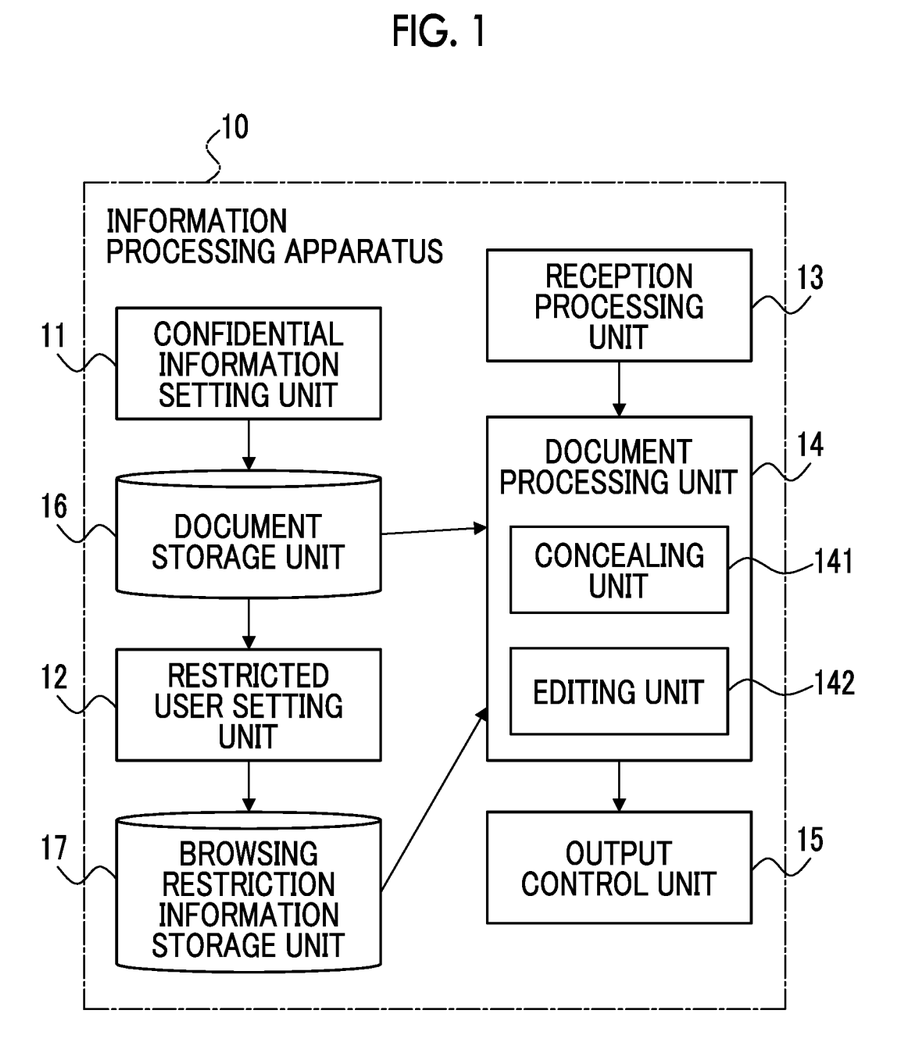
FIG. 1 is a block configuration diagram illustrating an information processing apparatus 10 in this exemplary embodiment.

FIG. 1 is a block configuration diagram illustrating an information processing apparatus 10 in this exemplary embodiment. The information processing apparatus 10 in this exemplary embodiment includes a confidential information setting unit 11, a restricted user setting unit 12, a reception processing unit 13, a document processing unit 14, an output control unit 15, a document storage unit 16, and a browsing restriction information storage unit 17. Constituents not used in description of this exemplary embodiment are not illustrated in the drawings.

The confidential information setting unit 11 sets confidential information in a document in accordance with a user operation. The document in which the confidential information is set is stored in the document storage unit 16. The restricted user setting unit 12 sets a user to which a browsing permission is not granted for the confidential information for each confidential information that is information included in the document and having confidentiality. A content set by the restricted user setting unit 12 is stored in the browsing restriction information storage unit 17 as browsing restriction information. The reception processing unit 13 receives an output request of the document from the user.

The document processing unit 14 processes the document of an output target into a form appropriate for the user in response to the output request from the user. In a case where the confidential information for which the browsing permission is not granted to the user is included in the document of the output target, a concealing unit 141 included in the document processing unit 14 processes the confidential information to be concealed. For example, in the case of outputting the document, concealing is performed by whiting out or blacking out a disclosure region of the confidential information. By such processing of the information, the user to which the browsing permission is not granted for the confidential information may know that the browsing permission is not granted for the confidential information. In addition, in a case where the document for which the output request is made from the user includes the confidential information for which the browsing permission is granted to the user and the browsing permission is not granted to another user, an editing unit 142 included in the document processing unit 14 edits the document to indicate that the browsing permission is not granted to the other user for the confidential information.

The output control unit 15 controls the output of the document to the user who makes the output request of the document. The document of the output target is a document processed by the document processing unit 14. The "output" of the document includes printing on a paper medium from a printing apparatus, display on a display of the information processing apparatus 10 or a user terminal individually used by the user, registration in a storage section, transmission to another apparatus through a network using an application having an electronic mail function or the like, and the like. In a case where the confidential information for which the browsing permission is granted to the user and the browsing permission is not granted to the other user is included in the document, the output control unit 15 may notify the user making the output request of the document that the browsing permission is not granted to the other user for the confidential information by outputting the document processed by the document processing unit 14. Each of the storage units 16 and 17 will be described together with description of operation.

Each of the constituents 11 to 15 in the information processing apparatus 10 is implemented by cooperative operation between the computer forming the information processing apparatus 10 and a program operated by the CPU mounted in the computer. In addition, each of the storage units 16 and 17 is implemented by the HDD mounted in the information processing apparatus 10. Alternatively, the RAM or an external storage section may be used through a network.

The program used in this exemplary embodiment may be provided not only by the communication section but also by storing the program in a computer readable recording medium such as a CD-ROM or a USB memory. The program provided from the communication section or the recording medium is installed on the computer, and various processes are implemented by causing the CPU of the computer to sequentially execute the program.

Next, operation in this exemplary embodiment will be described. In this exemplary embodiment, the document is output in response to the output request of the document from the user after processing depending on whether or not the user and the other user have the browsing permission for the confidential information is performed. However, processes such as setting of the confidential information for the document of a processing target and setting of the user related to the browsing permission for the confidential information need to be performed before a process of outputting the document is performed. Hereinafter, the processes performed in advance will be described.

Figure 2:
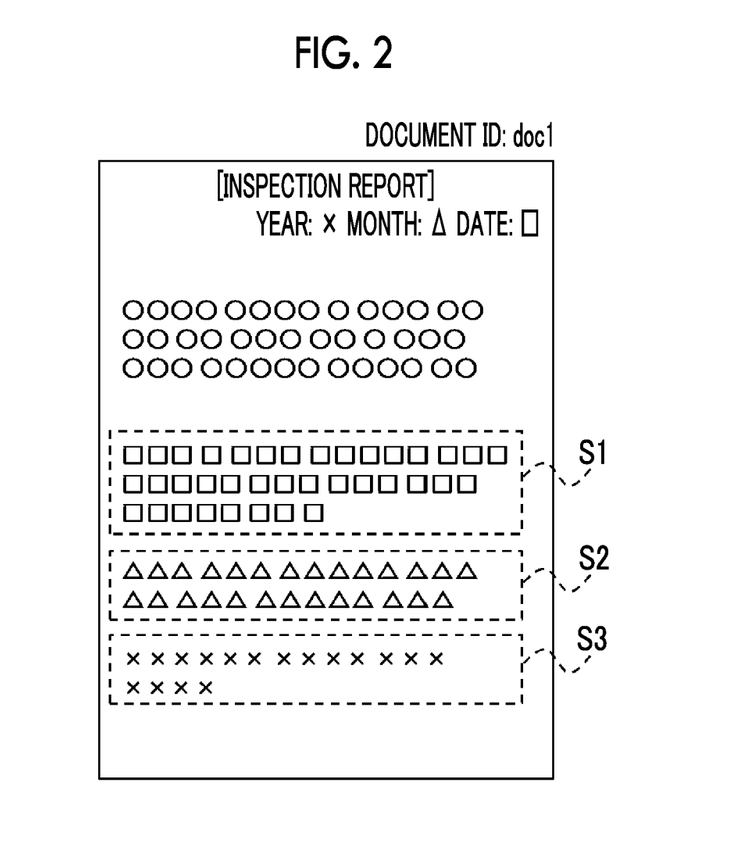
FIG. 2 is a diagram illustrating an example of a document in which confidential information is set in this exemplary embodiment.

First, in a case where the document of the processing target is received from the user such as the creator of the document, the confidential information setting unit 11 causes the user to designate the confidential information for the document. For example, the user is caused to designate the confidential information by displaying the document illustrated in FIG. 2 on the display and causing the user to designate the range of a part (hereinafter, referred to as the "disclosure region") in which the confidential information is disclosed. The confidential information setting unit 11 sets the confidential information in the document in accordance with an operation performed by the user. FIG. 2 illustrates an example in which confidential information S1, S2, and S3 is set for a document of which document identification information (hereinafter, a "document "ID") is "doc1". The confidential information setting unit 11 stores the document in the document storage unit 16 by adding information related to the confidential information S1, S2, and S3 such as the disclosure region in the document.

While the case of setting the confidential information by causing the user to designate the range is described here, the present invention is not necessarily limited to this example. For example, the user may be caused to designate attribute information related to a specific text as a character string, and the character string may be recognized and set as the confidential information.

The "attribute information related to text" is attribute information that is called a "font" or the like and is related to the design of the text or the style of the text. For example, the attribute information corresponds to attribute information related to the form of the text such as the font in a narrow sense corresponding to the design of the text, a text size, italic type, bold type, and a text color, and attribute information such as a strike-through line, an enclosure line, and a highlight pen added with respect to the text. The "attribute information related to text" is broadly divided into attribute information such as the font, the size, and the color of the text necessary for forming the text, and additional attribute information such as italic type and underlining for decorating the text. In the following description, simply the "attribute information" refers to the "attribute information related to text" unless otherwise specified.

Not only the character string including one attribute information but also a character string including a combination of at least two or more attribute information may be recognized and set as the confidential information. In the case of combining at least two or more attribute information, a combination in which the attribute information related to text to be combined conflicts may be restricted. For example, in a case where the attribute information related to text is the font of the text, Mincho font and Gothic font may not be set at the same time. Thus, this combination is restricted from being set.

Figure 3:
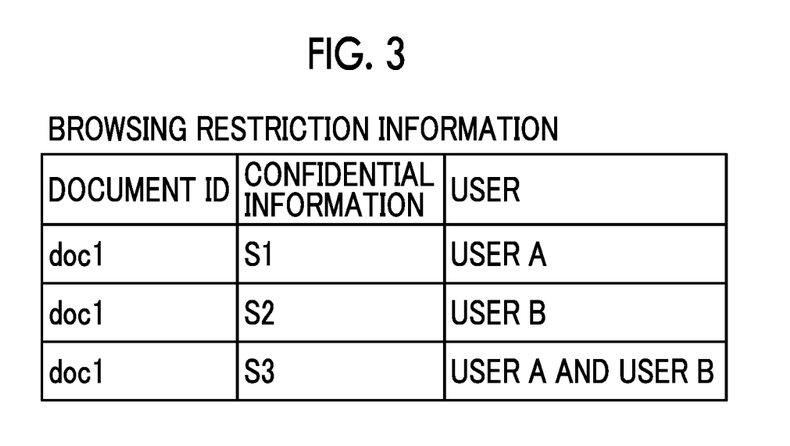
FIG. 3 is a diagram illustrating a data configuration example of browsing restriction information in this exemplary embodiment.

Next, the restricted user setting unit 12 sets the user to which the browsing permission is not granted for the confidential information for each confidential information set in the document in accordance with an operation instruction provided by the user such as the creator of the document in which the confidential information is designated. For example, the restricted user setting unit 12 displays the document on the display and causes the user to which the browsing permission is not granted to be input and designated for each confidential information in the document selected by the user such as the creator of the document. FIG. 3 illustrates an example of the browsing restriction information that is generated by the restricted user setting unit 12 in accordance with the input designation and is registered in the browsing restriction information storage unit 17.

The browsing restriction information is configured by associating the document ID with information for specifying the confidential information included in the document and the user to which the browsing permission is not granted for the confidential information. According to the setting example of data illustrated in FIG. 3, the browsing permission is not granted to a user A for the confidential information S1 of the document of the document ID "doc1" illustrated in FIG. 2, the browsing permission is not granted to a user B for the confidential information S2 of the document of the document ID "doc1", and the browsing permission is not granted to the users A and B for the confidential information S3 of the document of the document ID "doc1".

Setting of the confidential information for the document and setting of the user to which the browsing permission is not granted may be separately processed and thus, are described as separate processes in this exemplary embodiment by disposing the confidential information setting unit 11 and the restricted user setting unit 12. However, these setting processes may be processed together.

Figure 4:
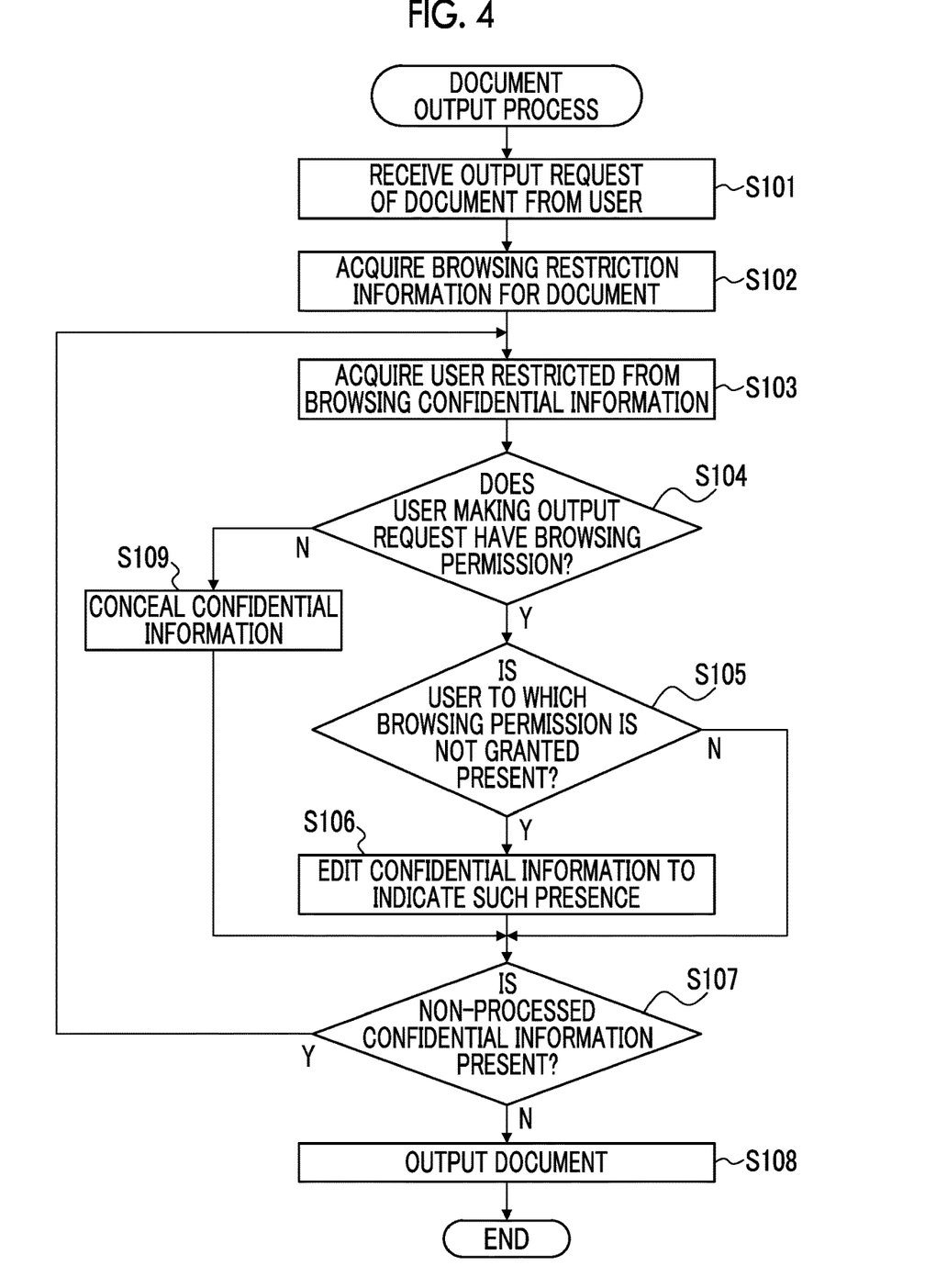
FIG. 4 is a flowchart illustrating a document output process in this exemplary embodiment.

Next, a process of outputting the document in response to a request from the user will be described using the flowchart illustrated in FIG. 4.

First, the reception processing unit 13 receives the output request of the document from the user (step S101). In the output request, at least information (for example, the "document ID") for specifying the document stored in the document storage unit 16 is designated. Alternatively, instead of using the document ID, the document for which the confidential information is already set and the browsing restriction information for the document is registered in the browsing restriction information storage unit 17 may be received. In the present description, "doc1" is designated as the document ID.

Next, the document processing unit 14 acquires the browsing restriction information of the document of the target of the output request from the browsing restriction information storage unit 17 based on the document ID "doc1" designated in the output request (step S102). As in the document of the document ID "doc1" illustrated in FIG. 3, the plurality of confidential information S1 to S3 may be set in the browsing restriction information. Thus, a process described below is performed for each confidential information.

In the following description, the document which is the processing target of the document processing unit 14 like the document stored in the document storage unit 16 will be referred to as an "original document" in order to easily distinguish the document from the document after processing.

First, the document processing unit 14 focuses on one confidential information and extracts a user ID of the user restricted from browsing the confidential information from the browsing restriction information (step S103). Basically, the processing target may be set in the order of registration in the browsing restriction information storage unit 17. However, the present invention is not necessarily limited to the order.

Here, the user who makes the output request is a user C. The document processing unit 14 compares the user ID of the output request with the user ID associated with the confidential information S1 of the processing target. The user C is not associated with the confidential information S1 at the head of the browsing restriction information. Thus, the browsing permission for the confidential information S1 is not restricted. That is, the browsing permission is granted. In a case where the browsing permission for the confidential information S1 is present (Y in step S104), next, the document processing unit 14 checks whether or not another user to which the browsing permission is not granted for the confidential information is present. In the setting example of the browsing restriction information illustrated in FIG. 3, the browsing permission is not granted to the user A for the confidential information S1 at the head of the browsing restriction information. In a case where the user to which the browsing permission is not granted is present (Y in step S105), the editing unit 142 edits the confidential information to indicate such presence (step S106). Whether or not to perform such editing will be described later.

In a case where non-processed confidential information is present (Y in step S107), a transition is made to step S103, and the above process is performed. According to the setting example of the browsing restriction information illustrated in FIG. 3, the browsing restriction information is set for all of the confidential information S1 to S3. Thus, editing is performed for all of the confidential information S1 to S3 (step S106).

In a case where the process (steps S103 to S106) is performed for all of the confidential information S1 to S3, the output control unit 15 performs control such that the document into which the original document is processed as necessary by the document processing unit 14 is output from a designated output destination (step S108).

In the process, in a case where the user to which the browsing permission is not granted for the confidential information is not present (N in step S105), the confidential information is not set as a concealing target and thus, is output in the form of the original document.

In a case where the user who makes the output request is not the user C and is the user A, the browsing permission is not granted for the confidential information S1 and S3 (N in step S104). Thus, the concealing unit 141 conceals the confidential information in a predetermined form (step S109).

Figure 5A:
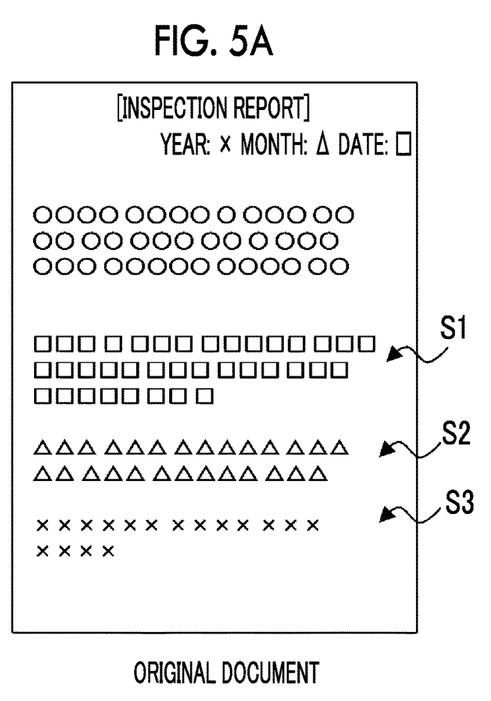
FIGS. 5A to 5D are diagrams illustrating an original document of an output target in this exemplary embodiment and an output form of the document in a case where the original document is presented to each user.
Figure 5B:
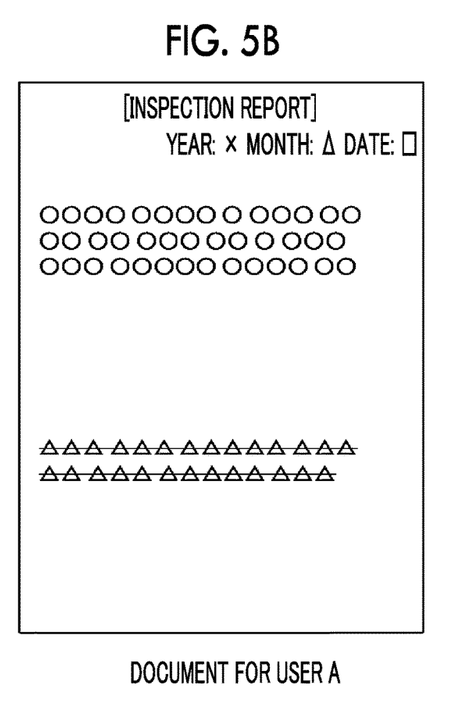
Figure 5C:
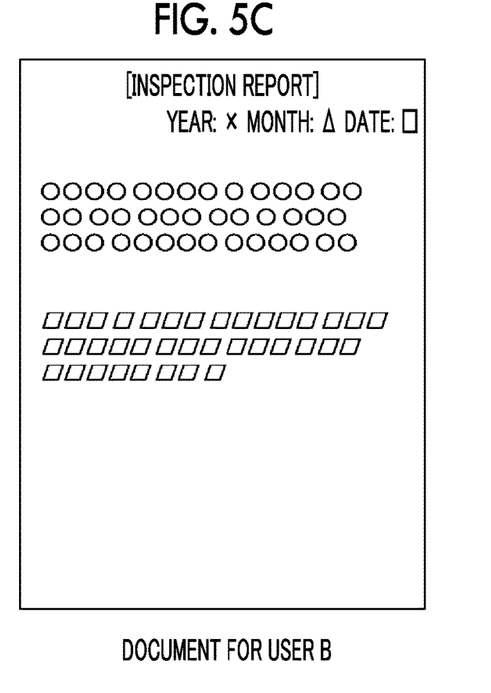
Figure 5D:
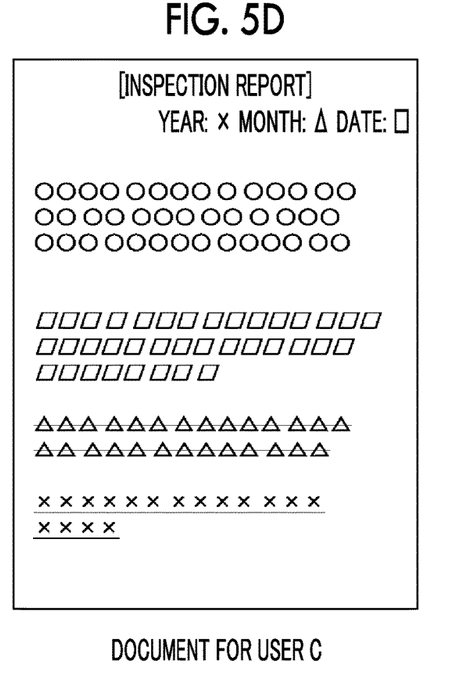

FIGS. 5A to 5D are diagrams illustrating the original document of the output target in this exemplary embodiment and an output form of the document in a case where the original document is provided to each user. FIG. 5A is the original document and is the same document as the document illustrated in FIG. 2. The confidential information included in the original document used here is information that includes a character string represented by a text code. FIGS. 5B to 5D illustrate the output form in a case where the user who makes the output request is each of the users A to C and the original document is provided to each of the users A to C.

According to the setting example of the browsing restriction information illustrated in FIG. 3, the browsing permission is not granted to the user A for the confidential information S1 and S3. Thus, the document "doc1" provided to the user A is output in a state where the confidential information S1 and S3 is whited out (alternatively, a blank state by deleting the confidential information) as illustrated in FIG. 5B. In FIGS. 5A to 5D, examples of concealing the confidential information for which the browsing permission is not granted by whiting out are illustrated. The browsing permission is granted to the user A for the confidential information S2. Thus, output is performed such that the confidential information S2 is browsable without concealing. The browsing permission is not granted to the user B for the confidential information S2.

Therefore, in this exemplary embodiment, in a case where the confidential information for which the browsing permission is not granted to another user (in this example, the user B) is included in the document, the confidential information in the original document is edited to indicate that the browsing permission is not granted to the other user. For convenience of description, the attribute information related to text is not set in the original document. In a strict sense, the attribute information such as the font, the size, and the color of the text necessary for forming the text is apparently set. The attribute information related to text that is not set in the original document means that additional attribute information related to decoration of text such as underlining and bold type is not set. For example, FIG. 5B illustrates an example of editing such that the attribute information related to text as a strike-through line is set in the confidential information S2 in the document provided to the user A in order to indicate that the browsing permission is not granted to the other user (in this example, the user B). This example is a change of the attribute information related to text from a state where the attribute information related to text as a strike-through line is not set to a state where the attribute information related to text is set. This change of the attribute information related to text is equivalent to editing of the confidential information in the original document and setting of the attribute information. In the example illustrated in FIG. 5B, the user A may not specify the user to which the browsing permission is not granted, but may know that the browsing permission is not granted to the other user by the setting of the strike-through line.

As described above, the confidential information for which the browsing permission is not granted is set to be not browsable by the user by concealing the confidential information. Thus, in the following description, the confidential information that is included in the document of the output target and for which the browsing permission is granted to the user making the output request but the browsing permission is not granted to the other user may be referred to as "confidential information of the concealing target" for convenience of description. In addition, the other user to which the browsing permission is not granted will be referred to as a "concealed user".

As described above, the user A is provided with the document illustrated in FIG. 5B. Thus, the user A may know that while the confidential information S2 is confidential information, the browsing permission is granted to the user A, and while who the other user is may not be specified, the confidential information S2 is concealed from the other user. In this exemplary embodiment, the confidential information S1 and S3 is whited out. Thus, the user A may not be sure that the confidential information is actually present in the disclosure regions of the confidential information S1 and S3 even by referring to the document illustrated in FIG. 5B. However, in a case where the confidential information S1 and S3 is concealed using a method such as blacking out, the user A may know that the confidential information S1 and S3 is concealed from the user A.

Hereinafter, the output forms of the document output to the users B and C will be described. A rule for deciding the output form of the document is the same as the case of the user A described using FIG. 5B. Thus, a duplicate description of the rule may not be repeated.

According to the setting example of the browsing restriction information illustrated in FIG. 3, the browsing permission is not granted to the user B for the confidential information S2 and S3. Thus, as illustrated in FIG. 5C, the document is output in a state where the confidential information S2 and S3 is concealed. Meanwhile, the browsing permission is granted to the user B for the confidential information S1. Thus, output is performed such that the confidential information S1 is browsable without concealing. However, since the user A to which the browsing permission is not granted for the confidential information S1 is present, the confidential information S1 of the original document is edited to indicate such presence, and then, the document "doc1" is provided to the user B. FIG. 5C illustrates an example of editing such that attribute information of italic type is set.

According to the setting example of the browsing restriction information illustrated in FIG. 3, the browsing permission is granted to the user C for any of the confidential information S1 to S3. Thus, as illustrated in FIG. 5D, output is performed such that any of the confidential information S1 to S3 is browsable without concealing. However, since the user A and/or the user B to which the browsing permission is not granted for the confidential information S1 to S3 is present, each of the confidential information S1 to S3 is edited to indicate such presence. For the confidential information S1, the user A is the concealed user. Thus, the confidential information S1 is edited such that attribute information of italic type is set in the same manner as FIG. 5C. For the confidential information S2, the user B is the concealed user. Thus, the confidential information S2 is edited such that attribute information of a strike-through line is set in the same manner as FIG. 5B.

For the confidential information S3, a plurality of concealed users are present and include the user A and the user B. In this case, the attribute information may be changed depending on the plurality of concealed users. For example, italic type is set in a case where the concealed user is the user A, and a strike-through line is set in a case where the concealed user is the user B. In this case, the confidential information S3 is edited such that a combination of two kinds of attribute information of italic type and a strike-through line is set. Accordingly, while the concealed user may not be specified for the confidential information S3, the user C may be informed that the confidential information S3 is concealed from both of the user from which the confidential information S1 is concealed and the user from which the confidential information S2 is concealed. In addition, since the confidential information S3 corresponds to a combination of the users A and B unlike the confidential information S1 and S2, the confidential information S3 may be edited such that different attribute information of underlining different from italic type and a strike-through line is set as illustrated in FIG. 5D. For example, in a case where the attribute information used for indicating the confidential information of the concealing target is set as a text font, two kinds of text fonts (for example, Mincho font and Gothic font) may not be set in combination. Thus, in this case, different attribute information from the confidential information S1 and S2 needs to be set like the confidential information S3 in FIG. 5D.

In a case where the original document is created using a text color of only black, and attribute information related to text color of red other than black is set in the confidential information S1 and attribute information related to text color of blue other than black is set in the confidential information S2, attribute information related to text color of green other than black, red, and blue may be set in the confidential information S3. That is, different attribute values may be set for each confidential information of the concealing target or each concealed user with respect to the same attribute information of the text color.

Not only the attribute value but also the attribute information may be differently set for each of the confidential information S1 to S3 of the concealing target or each concealed user (the user A, the user B, and the users A and B) as described above.

In the case of simply informing the user that the confidential information of the concealing target is present, the same attribute information may be set for all confidential information of the concealing target. For example, in a case where the user C makes the output request, a change to the same attribute information may be made for all of the confidential information S1 to S3 of the concealing target.

In the above description, the attribute information related to text is not set in the original document but actually, is set in many cases. In this case, as the attribute information used for indicating the confidential information of the concealing target, attribute information other than the attribute information used in the original document needs to be used in order to be distinguishable from the attribute information used in the original document. Therefore, the document processing unit 14 in this exemplary embodiment specifies the attribute information related to text used in the original document by analyzing the original document of the processing target, and employs attribute information other than the specified attribute information as the attribute information for indicating the confidential information of the concealing target. Accordingly, the user provided with the document after editing may determine the attribute information related to the document used in the original document and the attribute information related to the document used for indicating the confidential information of the concealing target.

In this case, however, the user needs to recognize the attribute information used in the original document in advance. Thus, for example, a rule related to the attribute information used in the original document and the attribute information set in the confidential information of the concealing target is delivered in advance to the user. Alternatively, for example, a description document showing a distinction between the attribute information used in the original document and the attribute information used for indicating the confidential information of the concealing target may be provided to the user together with the document illustrated in FIG. 5B to FIG. 5D. For example, a description document that discloses that the confidential information of the concealing target for the user A is represented by italic type, a strike-through line is added to the confidential information of the concealing target for the user B, and the confidential information of the concealing target for the users A and B is underlined is created and provided to the user C together with the document.

In addition, while mentioned in description for the document illustrated in FIG. 5D, two kinds of attribute information may be set in combination for the confidential information of the concealing target. In a case where a plurality of attribute information may be set in combination, the confidential information of the concealing target may be easily determined even in a case where additional attribute information related to decoration of text is used in the original document.

For example, even in a case where underlining is used in the original document, by combining underlining with another attribute information such as italic type, a character string in which attribute information of underlining and attribute information of italic type are combined may be determined as the confidential information of the concealing target. In addition, by further combining underlining with a plurality of attribute information of italic type and bold type, the confidential information of the concealing target may be easily determined.

Figure 6A:
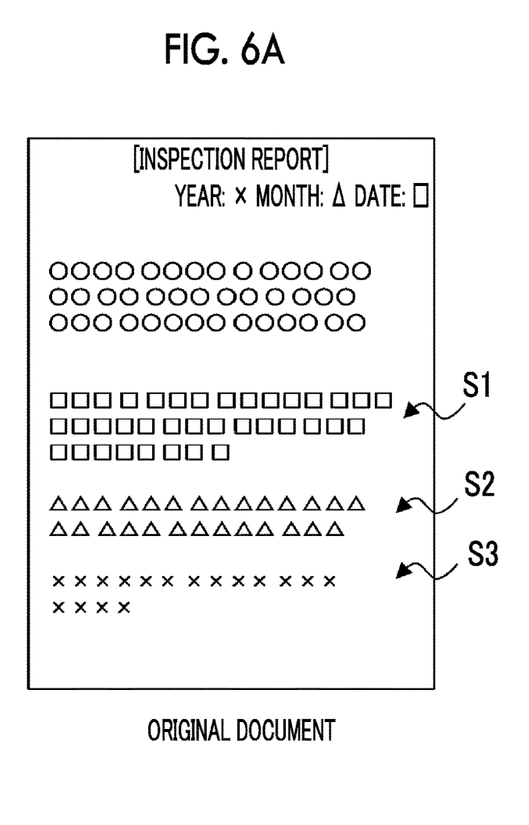
FIGS. 6A and 6B are diagrams illustrating the original document of the output target in this exemplary embodiment and another example of the output form of the document in a case where the original document is presented to a user C.
Figure 6B:
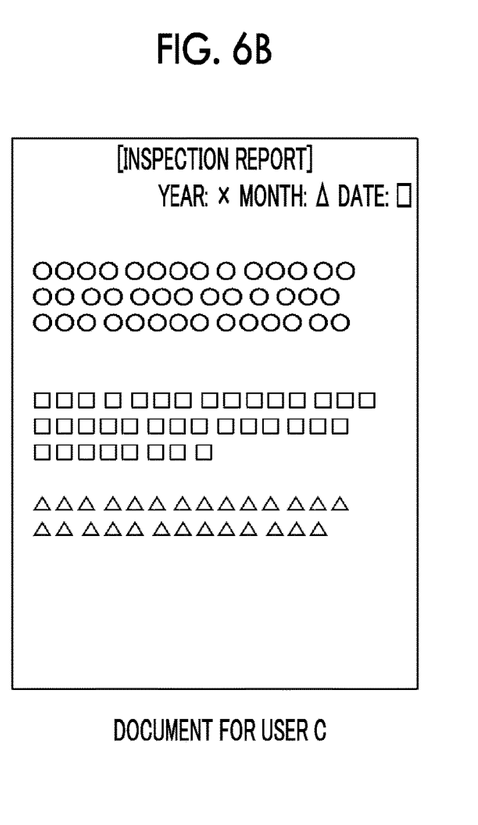

While an example of differently setting the attribute information depending on the concealed user is illustrated in FIGS. 5A to 5D, FIGS. 6A and 6B illustrate an example of employing density as the attribute information related to the document and differently setting the attribute value of the density depending on the number of users to which the browsing permission is not granted. That is, according to the setting example of the browsing restriction information illustrated in FIG. 3, the browsing permission is not granted to one person for each of the confidential information S1 and S2, and the browsing permission is not granted to two persons for the confidential information S3. In FIG. 6A, an original document that is the same original document as FIG. 5A and is output with the same density for any of the confidential information S1 to S3 is illustrated. Meanwhile, in FIG. 6B, a document that is processed to indicate a difference in number of persons for the user C by decreasing the density of the confidential information S3 below the density of the confidential information S1 and S2 is illustrated. Accordingly, the user C may know that the "confidential information of the concealing target" is included in the document and know that the number of concealed users is larger for the confidential information S3 than for the confidential information S1 and S2.

While the attribute information of the density is described as an example here, the present invention is not necessarily limited to the example. For example, the text size may be changed.

Figure 7A:
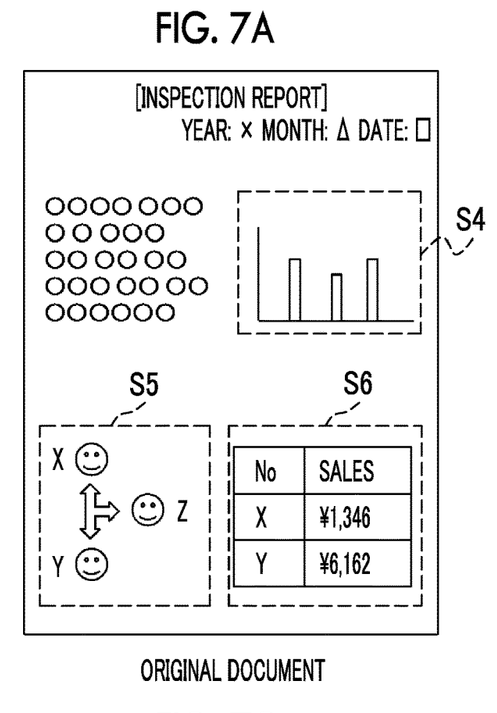
FIGS. 7A to 7D are diagrams illustrating the original document of the output target in this exemplary embodiment and another example of the output form of the document in a case where the original document is presented to each user.
Figure 7B:
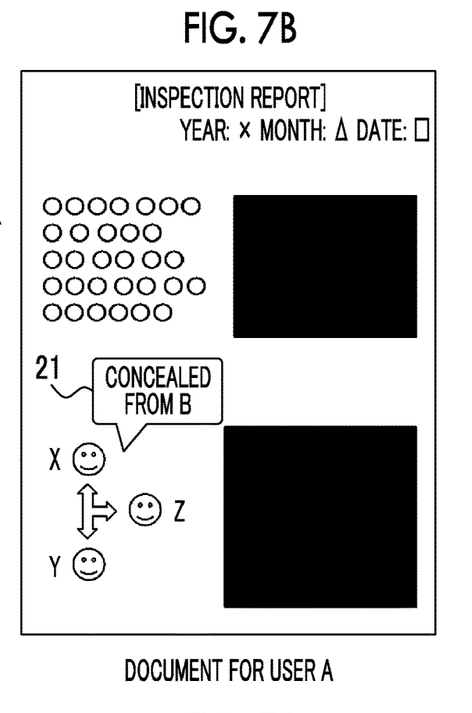
Figure 7C:
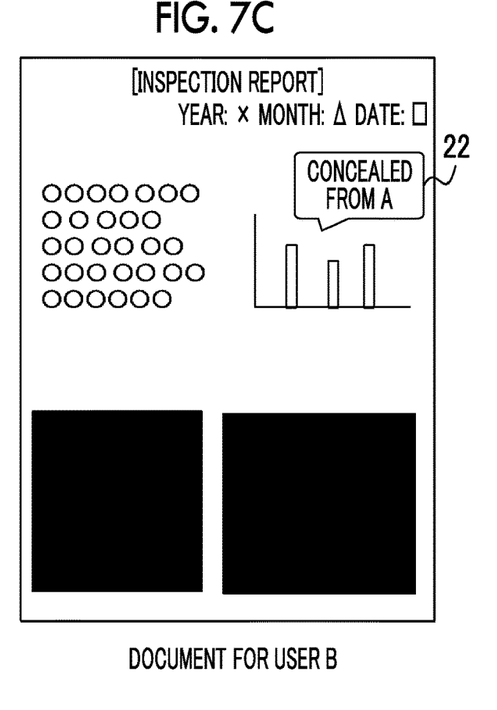
Figure 7D:
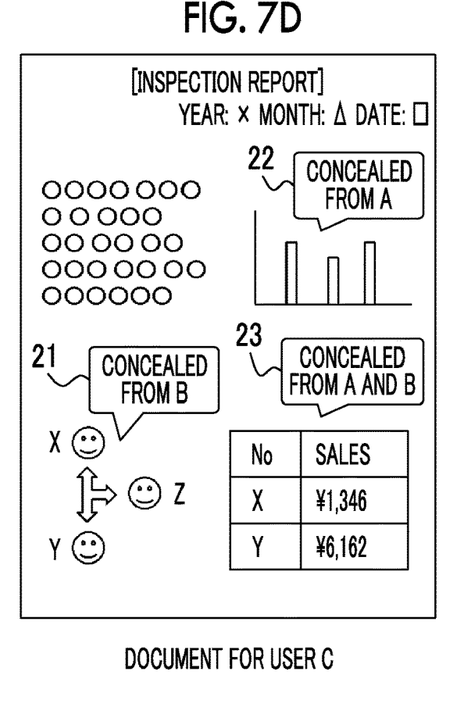

FIGS. 7A to 7D are diagrams illustrating the original document in a case where a document different from the document illustrated in FIG. 5A is set as the original document, and an output form of the document in a case where the original document is presented to each user. FIG. 7A is the original document, and FIG. 7B to FIG. 7D illustrate the output form in a case where the user who makes the output request is each of the users A to C and the original document is provided to each of the users A to C. While an example of a case where the document is configured with only the text represented by the text code is illustrated in FIG. 5A, an example of a document including an image that may not be represented by only the text code is illustrated in FIG. 7A.

As described above, the confidential information setting unit 11 causes the user to designate the confidential information by designating the range of the disclosure region of the confidential information. The restricted user setting unit 12 sets the user to which the browsing permission is not granted for the confidential information for each confidential information set in the document in accordance with an operation instruction provided by the user such as the creator of the document in which the confidential information is designated. The document ID of the original document illustrated in FIG. 7A is "doc2", and the restricted user setting unit 12 generates the browsing restriction information illustrated in FIG. 8 in accordance with the input designation provided by the user and registers the browsing restriction information in the browsing restriction information storage unit 17.

As described above, the process illustrated in FIG. 4 is executed in response to the request from the user. However, in the case of the original document illustrated in FIG. 7A, the confidential information of the concealing target is not a text. Thus, the attribute information related to text may not be set in the confidential information of the concealing target. Thus, the content of the process in step S106 performed by the editing unit 142 of the document processing unit 14 is different from the above process. Hereinafter, the process in step S106 will be described.

Figure 8:
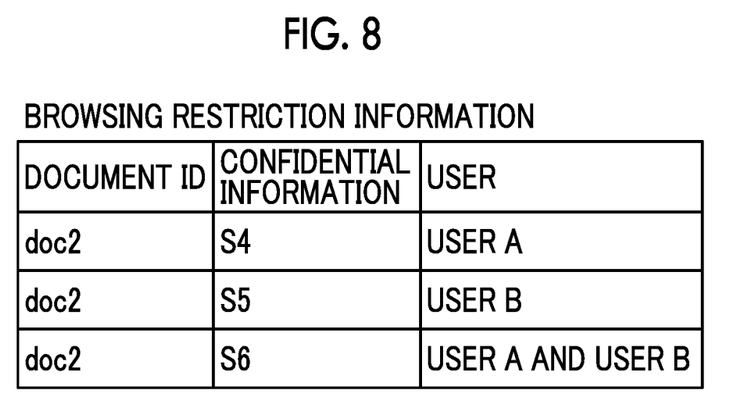
FIG. 8 is a diagram illustrating another data configuration example of the browsing restriction information in this exemplary embodiment.

According to the setting example of the browsing restriction information illustrated in FIG. 8, the browsing permission is not granted to the user A for confidential information S4 and S6. Thus, the document "doc2" provided to the user A is output in a state where the confidential information S4 and S6 is blacked out as illustrated in FIG. 7B. In FIGS. 7A to 7D, examples of concealing the confidential information for which the browsing permission is not granted by blacking out are illustrated. The browsing permission is granted to the user A for confidential information S5. Thus, output is performed such that the confidential information S5 is browsable without concealing. The browsing permission is not granted to the user B for the confidential information S5.

Therefore, in this exemplary embodiment, in a case where the confidential information for which the browsing permission is not granted to the other user is included in the document, the confidential information in the original document is edited to indicate that the browsing permission is not granted to the other user. As illustrated in FIGS. 7A to 7D, in a case where the confidential information is an image, the editing unit 142 adds an annotation 21 to the disclosure region of the confidential information. The annotation corresponds to grant determination information indicating that the browsing permission is not granted to the other user (in the example illustrated in FIG. 7B, the "user B") for the confidential information. In FIG. 7B, "B" that may be used for specifying the user is included in the annotation 21 as the identification information of the user to which the browsing permission is not granted. A message for specifying the user to which the browsing permission is not granted is included in the annotation 21. By providing the document illustrated in FIG. 7B to the user A, the user A perceives that the confidential information S4 and S6 is concealed from the user A, the confidential information S5 is confidential information but the browsing permission is granted to the user A, and the confidential information S5 is concealed from the other user "user B".

Hereinafter, the output forms of the document output to the users B and C will be described. A rule for deciding the output form of the document is the same as the case of the user A described using FIG. 7B. Thus, a duplicate description of the rule may not be repeated.

According to the setting example of the browsing restriction information illustrated in FIG. 8, the browsing permission is not granted to the user B for the confidential information S5 and S6. Thus, as illustrated in FIG. 7C, the document is output in a state where the confidential information S5 and S6 is concealed. Meanwhile, the browsing permission is granted to the user B for the confidential information S4. Thus, output is performed such that the confidential information S4 is browsable without concealing. However, since the user A to which the browsing permission is not granted for the confidential information S4 is present, an annotation 22 is added to the disclosure region of the confidential information S4 in order to indicate such presence. The annotation 22 includes identification information "A" of the user to which the browsing permission is not granted.

According to the setting example of the browsing restriction information illustrated in FIG. 8, the browsing permission is granted to the user C for any of the confidential information S4 to S6. Thus, as illustrated in FIG. 7D, output is performed such that any of the confidential information S4 to S6 is browsable without concealing. However, since the user A and/or the user B to which the browsing permission is not granted for the confidential information S4 to S6 is present, annotations 21 to 23 are added to the confidential information S4 to S6 in order to indicate such presence. The annotations 21 and 22 are described above. The annotation 23 includes identification information "A" and "B" of the users to which the browsing permission is not granted.

As described above, by adding the annotations 21 to 23 in which the identification information of the user may be included in correspondence with the confidential information S4 to S6, the confidential information concealed from the other user may be indicated, and which user is concealed from the confidential information may be indicated.

For the confidential information represented by the text code described using FIGS. 5A to 5D, the presence of the confidential information of the concealing target is indicated by, for example, setting the attribute information related to text. Alternatively, an annotation may be added as in the case of the image illustrated in FIGS. 7A to 7D. For example, a frame may be formed by surrounding the disclosure region of the confidential information including a text with a line, and the annotation may be associated with the frame. By using the annotation, any text information such as the identification information of the user may be added to the confidential information. A region for the annotation is needed in the document. That is, information not in the original document is disclosed in the document. In this case, setting the attribute information related to text may indicate the presence of the confidential information of the concealing target even in a case where the region for the annotation may not be secured in the document. In addition, the layout of the original document does not need to be changed at all. While an example of using the annotation as the grant determination information is described in this exemplary embodiment, the present invention is not limited to the example and may use other tools such as a tag.

In the above description, as illustrated in FIGS. 3 and 8, the user to which the browsing permission is not granted for the confidential information is set in the browsing restriction information. Alternatively, for example, a group to which one or a plurality of users belong may be set. In this case, in a case where the document for which the output request is made from the user includes the confidential information for which the browsing permission is granted to a group to which the user belongs and the browsing permission is not granted to a group to which the user does not belong, the editing unit 142 makes a change to attribute information indicating that the browsing permission is not granted to the group to which the user does not belong for the confidential information, or adds the annotation. The output control unit 15 notifies the user making the output request by, for example, transmitting the document after the original document is edited by the editing unit 142.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
for each confidential information which is information included in a document and having confidentiality, set a user to which a browsing permission is not granted for the confidential information; and
in a case where the document for which an output request is made from the user includes the confidential information for which the browsing permission is granted to the user and the browsing permission is not granted to another user, notify the user that the browsing permission is not granted to the other user for the confidential information,
wherein the processor is configured to perform notification by adding grant determination information indicating that the browsing permission is not granted to the other user for the confidential information to a disclosure region of the confidential information for which the browsing permission is granted to the user making the output request of the document and the browsing permission is not granted to the other user,
wherein the processor is configured to include identification information of the user to which the browsing permission is not granted for the confidential information in the grant determination information.

2. The information processing apparatus according to claim 1,
wherein the processor is configured to, in a case where the confidential information for which the browsing permission is not granted to the other user is information represented by a text code, change attribute information related to text.

3. The information processing apparatus according to claim 2,
wherein the processor is configured to perform notification by changing attribute information other than the attribute information related to text used in the document.

4. The information processing apparatus according to claim 2,
wherein the processor is configured to, in a case where a plurality of other users are present, change the attribute information related to text or an attribute value of the attribute information related to text depending on the plurality of other users.

5. The information processing apparatus according to claim 4,
wherein the processor is configured to differently set the attribute information related to text or the attribute value of the attribute information related to text for each of the plurality of other users.

6. The information processing apparatus according to claim 4,
wherein the processor is configured to differently set the attribute information related to text or the attribute value of the attribute information related to text depending on the number of the plurality of other users.

7. The information processing apparatus according to claim 1,
wherein the processor is configured to be capable of setting a group to which the browsing permission is not granted for the confidential information for each confidential information, and
in a case where the document for which the output request is made from the user includes the confidential information for which the browsing permission is granted to a group to which the user belongs and the browsing permission is not granted to a group to which the user does not belong, notify the user that the browsing permission is not granted to the group to which the user does not belong for the confidential information.

8. The information processing apparatus according to claim 1,
wherein the processor is configured to cancel the confidential information in a case where the document for which the output request is made from the user includes the confidential information for which the browsing permission is not granted to the user.

9. The information processing apparatus according to claim 1,
wherein the processor is configured to set a character string including attribute information related to a specific text among texts in the document as the confidential information.

10. The information processing apparatus according to claim 9,
wherein the attribute information related to the specific text includes a combination of at least two or more attribute information related to text.

11. The information processing apparatus according to claim 10,
wherein the processor is configured to, in a case where a plurality of the attribute information related to the specific text are settable, restrict setting of two or more conflicting attribute information related to text.

12. A non-transitory computer readable medium storing a program causing a computer to function as:
a user setting section that, for each confidential information which is information included in a document and having confidentiality, sets a user to which a browsing permission is not granted for the confidential information; and a notification section that, in a case where the document for which an output request is made from the user includes the confidential information for which the browsing permission is granted to the user and the browsing permission is not granted to another user, notifies the user that the browsing permission is not granted to the other user for the confidential information, wherein notification is performed by adding grant determination information indicating that the browsing permission is not granted to the other user for the confidential information to a disclosure region of the confidential info illation for which the browsing permission is granted to the user making the output request of the document and the browsing permission is not granted to the other user, wherein identification information of the user to which the browsing permission is not granted for the confidential information is included in the grant determination information.

13. An information processing apparatus comprising:

user setting means for, for each confidential information which is information included in a document and having confidentiality, setting a user to which a browsing permission is not granted for the confidential information; and notification means for, in a case where the document for which an output request is made from the user includes the confidential information for which the browsing permission is granted to the user and the browsing permission is not granted to another user, notifying the user that the browsing permission is not granted to the other user for the confidential information, wherein notification is performed by adding grant determination information indicating that the browsing permission is not granted to the other user for the confidential information to a disclosure region of the confidential information for which the browsing permission is granted to the user making the output request of the document and the browsing permission is not granted to the other user, wherein identification information of the user to which the browsing permission is not granted for the confidential information is included in the grant determination information.

* * * * *